(12) United States Patent
Zhang et al.

(10) Patent No.: US 9,581,686 B2
(45) Date of Patent: Feb. 28, 2017

(54) SILICON-BASED MONOLITHIC INTEGRATED SONAR ARRAY

(76) Inventors: Wendong Zhang, Taiyuan (CN); Chenyang Xue, Taiyuan (CN); Guojun Zhang, Taiyuan (CN); Linggang Guan, Taiyuan (CN); Jijun Xiong, Taiyuan (CN); Xibao Liu, Taiyuan (CN); Xiaoyao Wang, Taiyuan (CN); Jiao Xu, Taiyuan (CN)

(*) Notice: Subject to any disclaimer, the term of this patent is extended or adjusted under 35 U.S.C. 154(b) by 380 days.

(21) Appl. No.: 13/980,898

(22) PCT Filed: Mar. 11, 2011

(86) PCT No.: PCT/CN2011/000393
§ 371 (c)(1),
(2), (4) Date: Jul. 22, 2013

(87) PCT Pub. No.: WO2012/100380
PCT Pub. Date: Aug. 2, 2012

(65) Prior Publication Data
US 2013/0294204 A1   Nov. 7, 2013

(30) Foreign Application Priority Data
Jan. 24, 2011   (CN) .......................... 2011 1 0024893

(51) Int. Cl.
G10K 11/00   (2006.01)
G01S 7/521   (2006.01)
G01H 3/00   (2006.01)

(52) U.S. Cl.
CPC .............. *G01S 7/521* (2013.01); *G01H 3/00* (2013.01)

(58) Field of Classification Search
CPC ........ G01S 7/521; G01S 7/52079; G01H 3/00
USPC ......................................................... 367/171
See application file for complete search history.

(56) References Cited

U.S. PATENT DOCUMENTS

| | | | | |
|---|---|---|---|---|
| 5,047,946 A | * | 9/1991 | King | .......................... G01S 5/02 701/467 |
| 5,243,566 A | * | 9/1993 | Anderson | ............ G10K 11/002 310/337 |
| 2007/0202628 A1 | | 8/2007 | Wuertz | |
| 2007/0230721 A1 | | 10/2007 | White et al. | |

FOREIGN PATENT DOCUMENTS

| | | |
|---|---|---|
| CN | 101354283 A | 1/2009 |
| CN | 101738250 A | 6/2010 |

* cited by examiner

*Primary Examiner* — Mark Hellner

(57) ABSTRACT

The invention discloses a silicon-based monolithic integrated sonar array which includes a cantilevered sensing array structure, a sound-transparent jacket, and a support structure. The cantilevered sensing array structure is fixed on the support structure and in the sound-transparent jacket, wherein the sound-transparent jacket is filled with insulating dielectric oil, and the cantilevered sensing array structure is immersed in the insulating dielectric oil. The sound-transparent jacket is sealed and is treated with water tightness processing. The array can be applied into devices for underwater ultrasonic imaging, ultrasonic ranging, torpedo navigating, etc.

1 Claim, 3 Drawing Sheets

SILICON-BASED MONOLITHIC INTEGRATED SONAR ARRAY

FIELD OF THE INVENTION

The invention relates generally to a sonar apparatus, and in particular to a silicon-based monolithic integrated sonar array.

DESCRIPTION OF THE PRIOR ART

Modern Sonars generally utilize hydrophones for enhanced detection and positioning of targets, and the array technology is central and key to sonar systems nowadays. For examples, homing torpedo warheads, imaging arrays of synthetic aperture sonars, and wake towed linear arrays of warships all employ hydrophone arrays for realizing related functionalities. However, array components of traditional sonar arrays utilize scalar hydrophones, without making use of vector characteristics of vibration velocity of sound waves. Vector hydrophone arrays, if being used, will substantially decrease the array dimensions and increase the signal-to-noise ratio, and are hotspots of current research.

Active acoustic imaging, by making use of reverse reflections of emitted signals at the underwater target, gauges the orientation and location information of the target, and generates images of the target for further surveillance and identification of said target. Acoustic imaging is widely applied in ocean exploration and underwater military weapons. The key to underwater imaging is a suitable design of the sonar arrays, ensuring requisite resolution, while downsizing the arrays as much as possible. Utilization of vector hydrophones eliminates interference of isotropic noise without cancelling radiated noise of the target, thus is capable of supplying more information about the acoustic field for generating sharper beams to improve imaging resolution.

MEMS (Micro Electro Mechanical Systems) technology, developed from the micro-electric technology, blends multiple techniques from silicon micro processing and precision machining. It is capable of integrating single chips with diverse structures in one process, and is suitable for mass production. Sonar arrays based on the MEMS technology lead to small size, high sensitivity and low energy consumption.

Sonar in current engineering application adopts measuring arrays composed of multiple scalar hydrophones, which are made of piezoelectric ceramics, and are used for measuring acoustic pressure of the acoustic field. By combining multiple such hydrophone arrays, location and orientation of the target are measured. The technique is time-tested and has found engineering applications. Its shortcoming lies in the dependency of its detecting precision and range on the array aperture. Therefore, with the development of acoustic stealth techniques for underwater targets and the reduction of the radiated noise frequency, such type of sonar can only effectively position targets by enlarging the array aperture. Thus, its application in dimension-limited torpedos, depth bombs and intelligent torpedos with homing capacity requirement is restricted. And selection of hydrophones with good consistency from a large number of devices to construct traditional sonar array cells further adds up cost. Therefore, such type of sonar is only equipped in large military warships. For purpose of obstacle avoidance and measurement of distance in civil ships, other low cost hydrophones are in need.

In the research on vector hydrophone arrays, the resonant vector array thereof started off comparative early. Vector hydrophones of the like employ accelerometers with multiple single axises to construct testing arrays. Hurdles to research lie in that the detecting sensitivity of the encapsulated vector hydrophones depends on the sensing principle and structure design of the accelerometer, and that indicators of the sensitivity, stability and temperature coefficient of multiple separate uniaxial accelerometers are difficult to achieve consistency. A further nuisance for engineering application of the resonant vector hydrophone arrays is that the installation requires of flexible suspension.

SUMMARY OF THE INVENTION

In view of the foregoing, it is an object of the present invention to provide a silicon-based monolithic integrated sonar array which is applicable for underwater ultrasonic imaging, ultrasonic ranging, and for acoustic homing devices in a torpedo. Said array for detection purpose integrates a plurality of hydrophones on a monolithic silicon chip by means of MEMS technology, thus solving the consistency problem, downsizing the array substantially, being easily assembled on a ship due to its rigid connection, and having a low cost for mass production.

The afore-mentioned object of the invention is realized through the following technical solution:

A silicon-based monolithic integrated sonar array, comprising: a cantilevered sensing array structure, as sound-transparent jacket and a support, wherein the cantilevered sensing array structure is fixed on the support member and is arranged and fixed within the sound-transparent jacket, the sound-transparent jacket is filled with insulating dielectric oil, the cantilevered sensing array structure is immersed in the insulating dielectric oil, and the sound-transparent jacket is sealed and rendered to be water-tight as an entity.

In one embodiment of a silicon-based monolithic integrated sonar array of the present disclosure, the sound-transparent jacket is made of polyurethane sound-transparent material.

In another embodiment of a silicon based monolithic integrated sonar array of the present disclosure, the insulating dielectric oil is light wax oil.

In at other embodiment of a silicon-based monolithic integrated sonar array of the present disclosure, the cantilevered sensing array structure comprises multiple independent arm cells, said independent array cells include a silicon beam, a varistor R1 at the root part of the silicon beam, a Wheatstone bridge constructed by connecting resistors R2, R3 and R4 at the support base of the support, and a plurality of metal wires.

In another embodiment of a silicon-based monolithic integrated sonar array of the present disclosure, the distance between two said independent array cells adjacent to each other is half of the wavelength of the center frequency of signals to be received.

Advantages of the present invention are as follows:

Firstly, the invention is realizable on a monolithic silicon chip, substantially minimizing the array dimension;

Secondly, utilization of the MEMS technology facilitates mass production and leads to structure consistency and low production cost;

and

Thirdly, variation of its constituent dimensions results in portable receiving arrays with variable types and resonant frequencies for diverse application.

The invention as afore-mentioned is applicable for a probe in a sonar wet end, and by incorporating information processing units, is applicable in underwater ultrasonic imaging and ultrasonic ranging; it is further applicable in an acoustic homing device for a torpedo, i.e., by arranging the array within a minimal space of the dome of the torpedo warhead, the torpedo is navigation enabled; it is amply applicable in a underwater unmanned vehicle (UUV) and such like underwater vehicles. The invention will prove positive for scientific and engineering endeavors in underwater exploration and marine safety, and its low cost and mass production capacity will bring in enormous economic and social benefits.

DETAILED DESCRIPTION OF THE PREFERRED EMBODIMENTS

Figure 1:
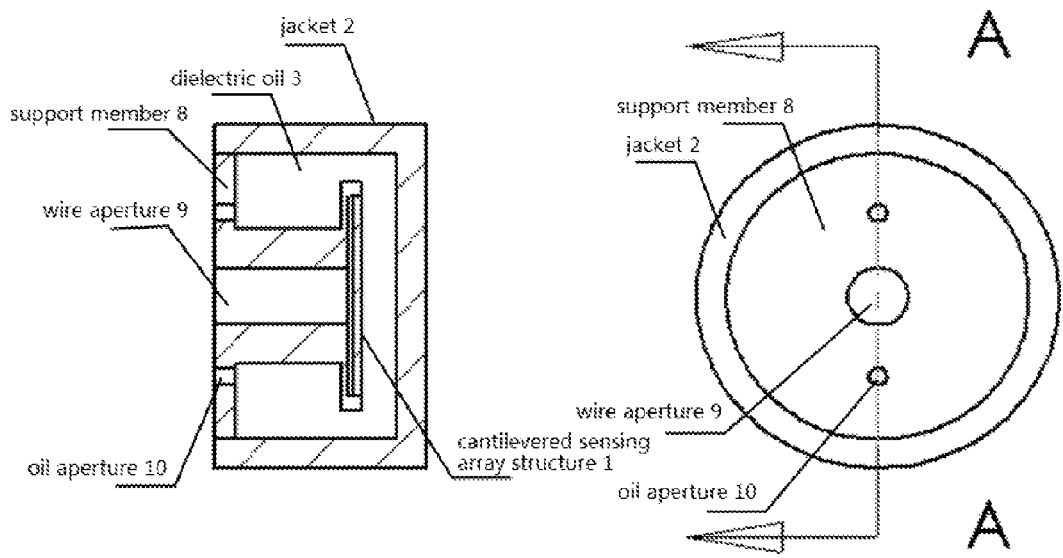
FIG. 1 is the sectional view of the structure of the sonar array (the jacket, chips, dielectric oil, and support member)

In combination with embodiments hereunder provided, a detailed description of the present invention is disclosed as follows:

The silicon-based sonar array comprises a cantilevered sensing array structure 1, a sound-transparent jacket 2, and dielectric oil 3 within the jacket (as shown in FIG. 1), wherein the cantilevered sensing array structure 1 is fixed on the support member of stain-less steel, and is welded with conducting wires leading out of the wire aperture 9. The cantilevered sensing array structure 1 is arranged inside a pre-fabricated sound-transparent jacket 2 fixedly, and light wax oil is injected via the oil aperture 10. The oil aperture is sealed and the entity thus far procured is rendered to be water-tight, thereby fabrication of a silicon-based monolithic integrated sonar array is accomplished.

The sound-transparent jacket 2 is made of polyurethane sound-transparent material, and its entirety is rendered to be water-tight for protection of its interior structure. The interior of the jacket 2 is filled with dielectric oil 3. The dielectric oil adopts light wax oil, which is comparable for its acoustic resistance and density to sea water, and functions to be sound transparent and insulating. The cantilevered sensing array structure 1 is immersed in the dielectric oil 2.

Figure 2:
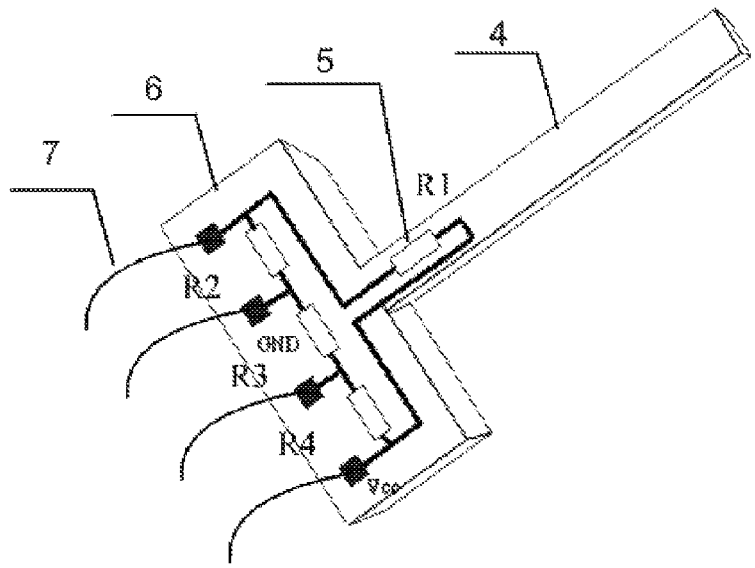
FIG. 2 is the schematic diagram of a single array cell of the cantilevered sensing array structure 1.

A single array cell of the cantilevered sensing array structure 1, as shown in FIG. 2, comprises a silicon beam 4, a piezoelectric resistor 5 (R1) at the root part of the silicon beam, a Wheatstone bridge formed by connecting resistors R2, R3 and R4 at the support base 6, and a plurality of metal wires 7. A single array cell works under the following mechanism: when a signal acts on the silicon beam 4, the beam will react, thereby deforming itself, resulting in a change of the resistance value R1 of the piezoelectric resistor 5 at the root part of the beam, and further leading to a change of the output of the Wheatstone bridge formed by connecting the strain piezoelectric resistance R1 and resistances R2, R3 and R4 at the support base 6. The metal wires 7 transmit the signals to the ensuing processing circuits. Based on the output variations of the Wheatstone bridge, underwater acoustic signals are measured. Where multiple such structures are arranged according to various formations on a single chip, sonar arrays of various shapes are constructed.

Figure 3:
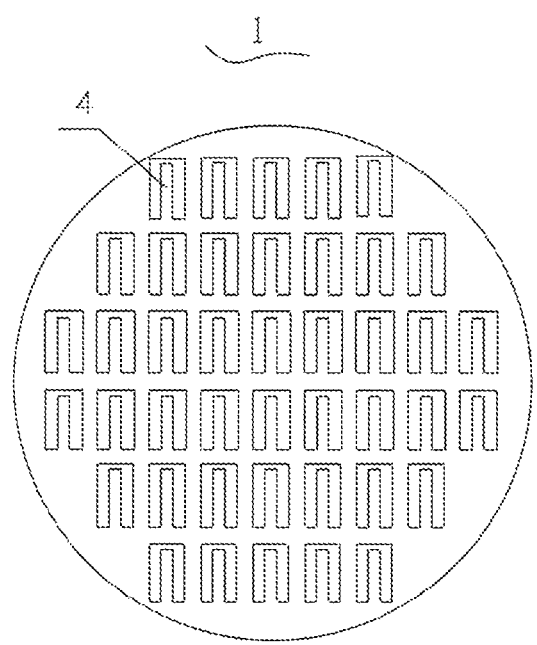
FIG. 3 is the schematic diagram of the cantilevered sensing array structure.

FIG. 3 is the schematic diagram of the cantilevered sensing array structure, wherein the distance between two array cells is half of the wavelength of the center frequency of the signals to be received.

Calculations and simulations are carried out for the designed structure. Take a single array cell as example, the vibration model of the beam is established, and the mechanical parameters of the structure are analyzed. The first order resonance frequency of the structure is calculated according to formula (1), and the surface train of the beam being acted on with an external force F is described with formula (2).

$$f_1 = \frac{0.55966}{l^2}\sqrt{\frac{EK^2}{\rho}} \quad (1)$$

$$\sigma = \frac{F(l-x)}{I}a \quad (2)$$

Where E is the Young's modulus, and $$K^2 = \frac{1}{S}\int_s r^2 \, dS$$

is called the radius of gyration. For a rectangular section of a×b (where a and b stand for the beam thickness and the beam width, respectively), $$K^2 = \frac{a^2}{12}$$

and $$I = \frac{b \times a^3}{12}$$

is the moment of inertia of the section ρ is density of the material, and l stands for the length of the beam.

Calculations show that when dimensions of the silicon beam are selected as 400 μm×130 μm×20 μm (beam length×width×thickness), the resonance frequency of the structure will be 150 KHz, and the distance between the array cell can be chosen as 5 mm.

Figure 4:
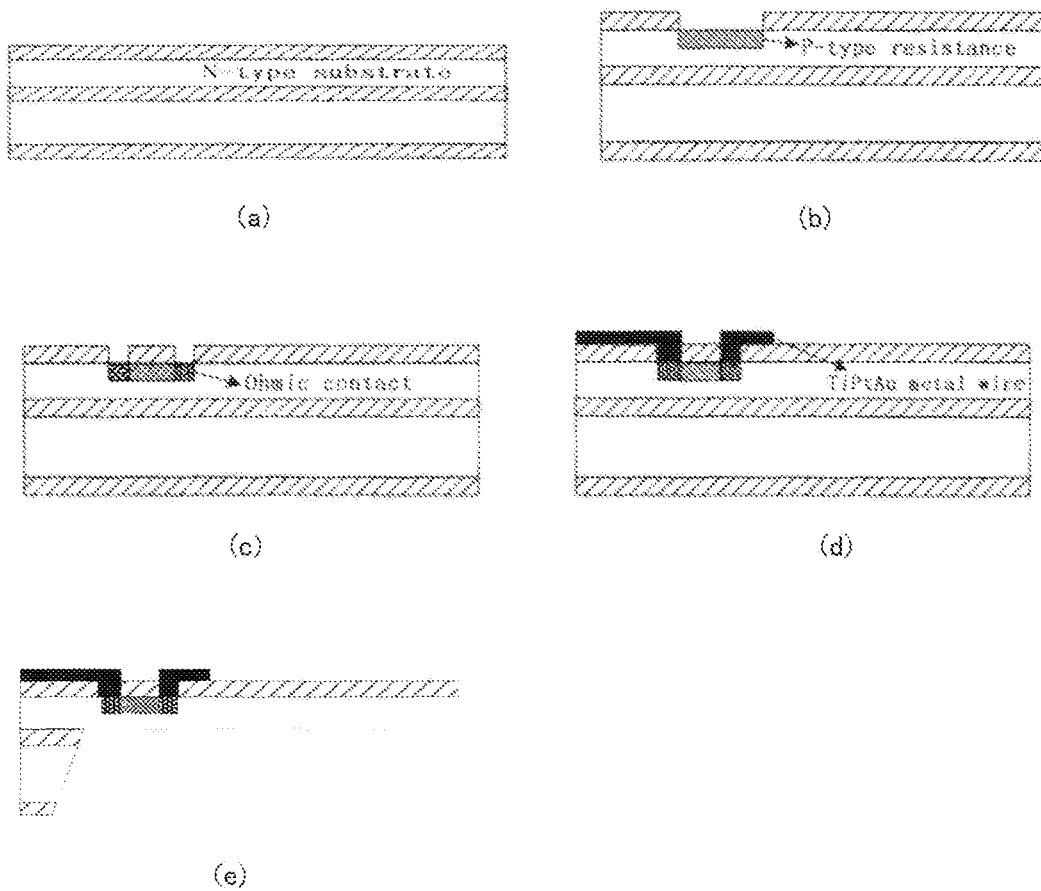
FIG. 4 is the process flow chart for manufacturing the array cell (a single array cell): (a) Preparation, oxidization, (b) front side boron diffusion, resistance forming, (c) re-oxidization, diffusion of boron concentration, (d) ohmic contact, Au evaporation, (e) back-cavity corrosion, structure release.

For fabrication of the cantilevered sensing array structure, the MEMS technology is applied, with the process comprising: oxidization, photoetching, etching, injection of ions, evaporation plating. A more detailed description of the process follows:

Take an SOI (silicon-on-insulator) silicon chip, rinse, oxidize, to form a silica layer (as is shown in (a) of FIG. 4);

With silica as mask, pattern the piezoelectric resistance chip, inject boron ions, to form a P-type piezoelectric resistor (as is shown in (b) of FIG. 4);

Re-oxidize, and pattern an ohmic aperture, inject boron ions, to form an ohmic contact (as is shown in (c) of FIG. 4);

Sputter TiPtAu, to pattern and form a metal wire (as is shown in (d) of FIG. 4);

Pattern on the reverse side, and form back-cavities by isotropic EWP corrosion, pattern on the front side and etch and penetrate by means of ICP.

Without dicing a circular planar array is constructed.

Encapsulate the above array structure within a specially made tube-shell, bond Au-wires, and a basic unit of the sonar array is constructed.

At the assembly stage, fix the cantilevered sensing array structure 1 fabricated so far on a support member 8 of stain-less steel, weld conducting wires and lead out via the wire aperture 9; arrange the sensing array within a pre-fabricated sound-transparent jacket 2 fixedly, and inject light wax oil 3 via the oil aperture; seal the oil aperture and render the entirety to be water-tight, and a silicon-based integrated sonar array is thus fabricated.

It is understood that various changes might be made by a person skilled in the art based on the fore-going description without departing from the spirit and scope of the present invention, all of which shall fall within the scope of the Claims of the present invention.

The invention claimed is:

1. A silicon-based monolithic integrated sonar array, comprising: a cantilevered sensing array structure, a sound-transparent jacket and a support member, wherein the cantilevered sensing array structure is fixed on the support member and is arranged fixedly within the sound-transparent jacket, the sound-transparent jacket is filled with an insulating dielectric oil, the cantilevered sensing array structure is immersed in the insulating dielectric oil, and the sound-transparent jacket is sealed and rendered to be water-tight as an entity; the cantilevered sensing array structure comprises a plurality of independent array cells; said independent array cell includes a silicon beam, a varistor R1 at a root part of the silicon beam, a Wheatstone bridge formed by connecting resistors R2, R3 and R4 at a support base of the array cell, and a plurality of metal wires;

wherein the sound-transparent jacket is made of polyurethane sound-transparent material; the insulating dielectric oil is a light wax oil; the varistor R1 is a piezoelectric resistor; the support member is of stain-less steel;

wherein the cantilevered sensing array structure is an SOI silicon chip in which the array cells are formed;

a distance between two said independent array cells adjacent to each other is half of a wavelength of a center frequency of signals received thereat; the distance is 5 mm when the beam length of the silicon beam is 400 μm, the width of the silicon beam is 130 μm and the thickness of the silicon beam is 20 μm.

\* \* \* \* \*

UNITED STATES PATENT AND TRADEMARK OFFICE
CERTIFICATE OF CORRECTION

PATENT NO. : 9,581,686 B2
APPLICATION NO. : 13/980898
DATED : February 28, 2017
INVENTOR(S) : Zhang et al.

It is certified that error appears in the above-identified patent and that said Letters Patent is hereby corrected as shown below:

On the Title Page

Please add Item (73) Assignee:
(73) Assignee NORTH UNIVERSITY OF CHINA, Taiyuan, China Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*